Aug. 22, 1961 — J. J. WEBER — 2,996,755
HOPPER TYPE SAUSAGE STUFFING APPARATUS
Filed Aug. 19, 1959 — 2 Sheets-Sheet 1
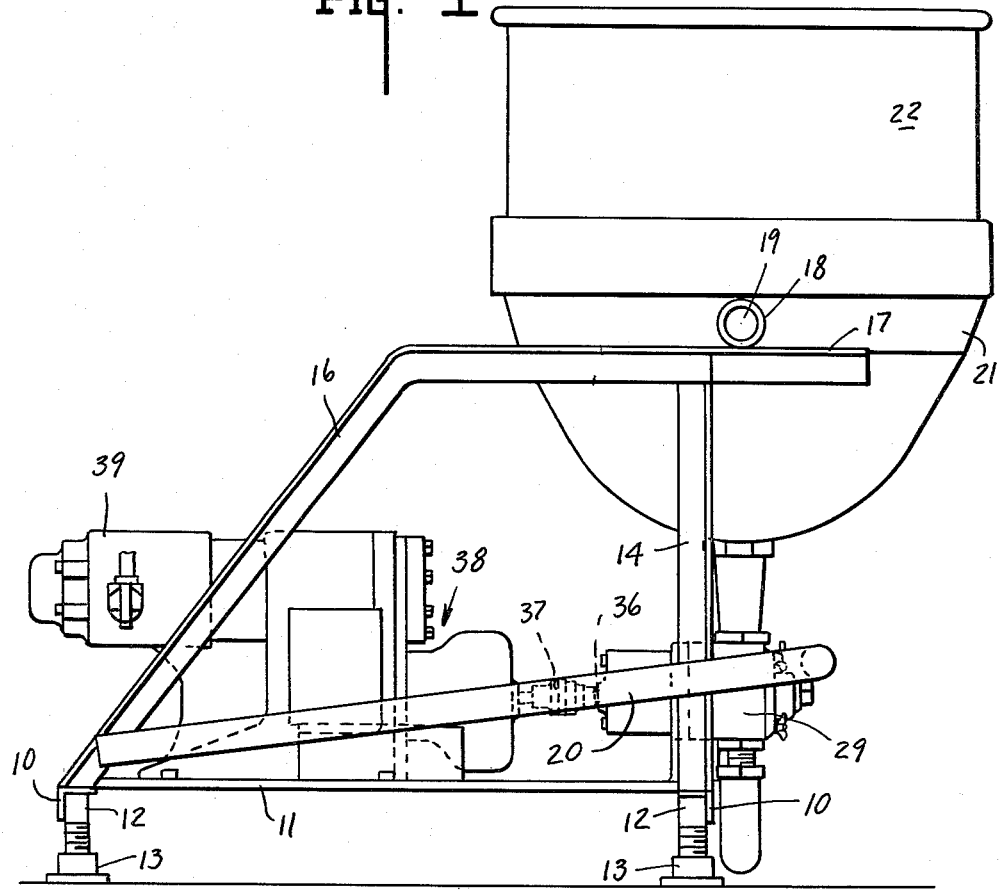
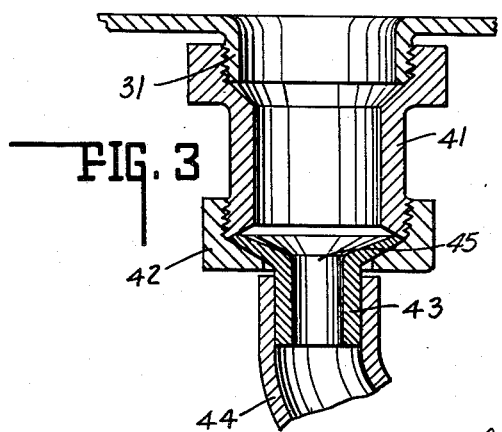
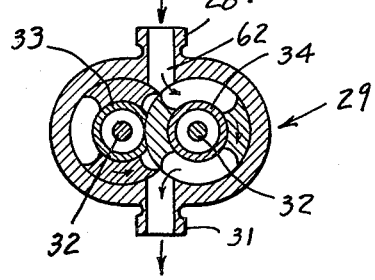
INVENTOR.
JOSEPH J. WEBER.
BY
Lockwood, Woodard, Smith & Weikart.
ATTORNEYS.

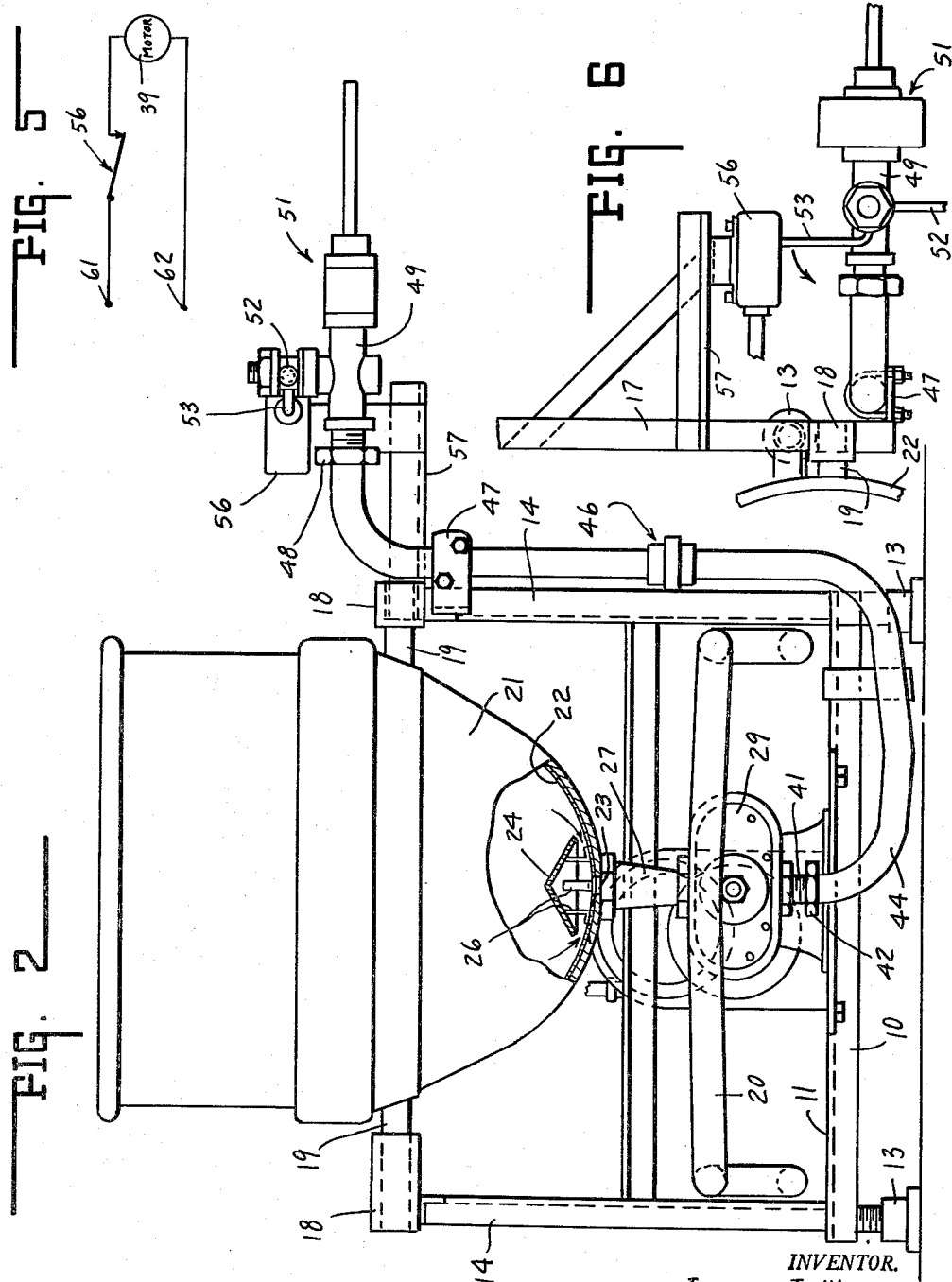

United States Patent Office 2,996,755
Patented Aug. 22, 1961

2,996,755
HOPPER TYPE SAUSAGE STUFFING APPARATUS
Joseph J. Weber, Indianapolis, Ind., assignor to Stark, Wetzel & Co., Inc., Indianapolis, Ind., a corporation
Filed Aug. 19, 1959, Ser. No. 834,816
2 Claims. (Cl. 17—37)

This invention relates generally to the manufacture of sausage or the like, and in particular to a hopper type stuffing apparatus.

In the past, attempts have been made to use a hopper type arrangement for feeding sausage stuffing ingredients in emulsion form to the suction side of a stuffing pump with the material discharged at the pump outlet being delivered to a conventional sausage stuffing head. These attempts have not been entirely successful, one reason being the inability to achieve the proper balance between delivery pressure and volumetric rate of flow of the emulsion to meet market requirements, such as firmness in the finished product.

It is the primary object of the present invention to provide a sausage stuffing apparatus which utilizes a hopper type feed to a positive displacement pump and incorporating a restricted orifice at the discharge side of the pump whereby the discharge pressure of the emulsion passing through the pump is raised to the desired value.

A further object of the present invention is to provide a sausage stuffing apparatus of the type referred to in which the discharge aperture in the hopper is shielded by a frusto-conical guard to prevent bridging or blocking of the aperture during the operation of the apparatus.

A further object of the present invention is to provide a sausage stuffing apparatus of the type referred to which utilizes a mechanical interlock between the valve controlling emulsion flow to the sausage stuffing head and the switch controlling the electrical prime mover for the pump so that, in normal operation, the controlling valve will be opened before the pump is started.

The full nature of the invention will be understood from the accompanying drawings and the following description and claims:

FIG. 1 is a side view of apparatus embodying the present invention.

FIG. 2 is an end view of the apparatus shown in FIG. 1 with a portion broken away to expose certain internal components.

FIG. 3 is an enlarged sectional view showing the fitting providing a restricted orifice.

FIG. 4 is a sectional view schematically showing the pump forming the present invention.

FIG. 5 is a schematic wiring diagram for the apparatus.

FIG. 6 is a fragmentary, top plan view of a portion of the apparatus shown in FIG. 2.

Referring initially to FIGS. 1 and 2, the apparatus of the present invention includes a supporting frame made up of horizontally extending angle irons 10 having a base plate 11 rigidly secured thereto. Extending downwardly from the four corners of the generally rectangular structure thereby provided are posts 12 which are threaded at their lower ends to accommodate shoes 13. The shoes 13 are adjustable on the posts to permit leveling of the supporting frame for its accommodation to an irregular supporting surface. Extending upright from one end of the base plate 11 are upright angle irons 14. From the opposite end of the base plate 11 further angle irons extend, these members having inclined portions 16 and horizontal portions 17. The upper members of the frame have welded thereto a generally U-shaped guard rail 20 which extends across one end of the frame.

Welded or otherwise rigidly secured to the horizontal portions 17 are sleeve bearings or trunnions 18 which accommodate stub shafts 19. The shafts are welded to and extend sidewardly from a cast iron jacket 21 which accommodates a stainless steel hopper 22, the hopper extending upwardly beyond the upper margin of the jacket. As may best be seen in FIG. 2, the base of the hopper is provided with a discharge aperture 23. Disposed in overlying relation to the aperture is a frusto-conical guard 24 which is mounted by means of supports 26 fastened by any suitable means to the hopper.

Attached to a threaded flange (not shown) adjacent the aperture 23, is a fitting 27 which at its lower end is threaded on a circular flange 28 (FIG. 4) which defines the suction aperture of a pump 29. The pump is of a conventional positive displacement, rotary type and is shown in detail in FIG. 4. As may be seen in FIG. 4, opposite the inlet flange 28, the pump is provided with a flange 31 defining its outlet or discharge aperture. Within the pump casing spaced parallel shafts 32 serve to move, in the directions indicated, the dual bladed impellers 33 and 34. It will be understood that as the impellers are rotated in the directions indicated, the impellers will move the material flowing through the pump from its suction aperture to its discharge aperture.

A pump drive shaft 36 serves to rotate the shafts 32 by suitable gearing (not shown). A drive coupling 37 connects the pump shaft 36 to a conventional drive means comprising a variable speed driving mechanism of conventional type, indicated generally at 38, whose prime mover is an electric motor 39.

As may best be seen in FIG. 3, the threaded flange 31 defining the discharge aperture of the pump 29 has threaded thereon a reducer fitting 41 which, in turn, has threaded thereon a retaining nut 42 which clamps to the end of the fitting 41 an orifice member 43. The central bore through the member 43 is of considerably smaller diameter than the internal diameter of either the fitting 41 or the flange 31 so that a restricted orifice 45 is thereby provided. Sealed and rigidly attached by any suitable means to the end of the member 43 is a conduit 44 which is here shown as stainless steel tubing, but which might also take the form of stainless steel mesh flexible food hose having a non-toxic liner. The conduit 44 may be provided with a conventional union 46 and may be supported by means of a bracket 47 upon the adjacent upright 14.

The conduit 44 is connected by means of a fitting 48 to one side of a conventional plug valve 49 adapted to control the flow of emulsion or similar material through the conduit. The outlet side of the valve 49 is connected to a conventional sausage filling head, indicated generally at 51. The head 51 is not described in detail herein since it is of conventional type and its specific construction forms no part of the present invention.

The valve 49 is provided with a sidewardly extending manual operator 52. As may best be seen in FIG. 6, the valve is further provided with an arm 53 whose terminal end cooperates with the operating member 54 of a normally closed switch 56. The switch may be suitably supported upon an upright member 57 extending sidewardly from the horizontal portion 17 of one of the frame side members. As shown in FIG. 6, the manual operator 52 is in valve closed position and the arm 53 holds the switch 56 open. As the operator 52 is moved through 90° counterclockwise, as viewed in FIG. 6, the valve will be opened and the switch 56 will move to closed position.

Referring to FIG. 5, there is shown a schematic wiring diagram for the apparatus. The switch 56 and the pump drive motor 39 are connected in series across terminals 61 and 62, which, in turn, may be connected to a suitable source of electrical power (not shown). From FIGS. 5 and 6 it will be evident that the mechanical interlock between the valve 49 and the switch 56, provided by the arm 53, is such as to assure that the pump motor is deenergized whenever the valve 49 is closed. This arrangement prevents damage to the pump and to the components connected to the discharge side of the pump which would occur should the conduit 44 be blocked while the pump motor 39 is in operation.

In operation, a suitable material, such as a sausage casing filling emulsion, may be introduced into the hopper 22. The operator 52 for the valve 49 may then be moved to open position. The pump will thereupon be started and the emulsion, indicated at 62 in FIG. 4, will be moved through the pump. The emulsion will then be delivered through the fitting 41 and through the restricted orifice formed by the member 43 into the conduit 44. The emulsion then passes through the valve 49 and the head 51. To stop the operation of the apparatus, the valve operator 52 is moved to its position shown in FIG. 6, whereupon the conduit 44 will be blocked and the switch 56 will be open to deenergize the pump motor 39.

It should be noted that the pump is of the positive displacement type and that with each revolution of the shafts 32, a given volume of emulsion is transferred from the suction side to the discharge side of the pump. The pressure developed by the pump will reach whatever value is required to force the emulsion through the discharge line, that is, through the restricted orifice provided by the member 43 and the conduit 44. Since the discharge pressure by the pump is governed solely by the load thereon, it may be seen that the provision of the restricted orifice at its discharge side is an important feature of the present invention, this orifice or restriction serving to increase the pressure of the given volume of emulsion passing through the head 51. The sausage casings may thus be filled at the desired pressure and will result in a finished product having an improved texture and appearance over sausages produced by conventional hopper fed apparatus. In drawing the emulsion from the hopper through the aperture 23, the guard 24 serves to prevent bridging and blocking of the orifice, the emulsion being drawn to the aperture along the sides of the hopper as indicated by arrows in FIG. 2.

It will be noted that the pivotal mounting for the hopper and its jacket 21 provided by the shafts 19 and trunnions 18 permit it to be tilted for cleaning subsequent to the detachment and disassembly of the pump therefrom.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A sausage stuffing apparatus comprising in combination a hopper adapted to receive sausage emulsion and having a discharge aperture at the base thereof, a frustoconical guard member supported within said hopper in overlying relation to said aperture, a positive displacement, rotary pump having its suction side communicating with said hopper aperture, an electrically operated driving means for said pump, the discharge side of said pump being connected to a conduit for delivering emulsion to a sausage stuffing head, a manually operable valve controlling flow through said conduit, a switch controlling the application of electrical power to said pump driving means, a member carried by said valve and cooperating with said switch for assuring that said switch is open when said valve is closed, and a fitting providing a restricted orifice between said pump discharge and said conduit for increasing the discharge pressure of said pump for a given volumetric rate of emulsion flow.

2. A sausage stuffing apparatus comprising in combination a hopper adapted to receive sausage emulsion and having a discharge aperture at the base thereof, a frustoconical guard member supported within said hopper in overlying relation to said aperture, a positive displacement, rotary pump having its suction side communicating said hopper aperture, an electrically operated driving means for said pump, the discharge side of said pump being connected to a conduit for delivering emulsion to a sausage stuffing head, a valve controlling flow through said conduit, a switch controlling the application of electrical power to said pump driving means, means cooperating with said switch and said valve for assuring that said switch is open when said valve is closed, and a fitting providing a restricted orifice between said pump discharge and said conduit for increasing the discharge pressure of said pump for a given volumetric rate of emulsion flow.

References Cited in the file of this patent

UNITED STATES PATENTS

| | | |
|---|---|---|
| 765,899 | Louden | July 26, 1904 |
| 1,054,633 | Balcker | Feb. 25, 1913 |
| 2,021,831 | Brighthill | Nov. 19, 1935 |
| 2,253,465 | Tomlinson | Aug. 16, 1941 |
| 2,701,549 | Jones | Feb. 8, 1955 |
| 2,905,967 | Hensgen et al. | Sept. 29, 1959 |